Figure 1:
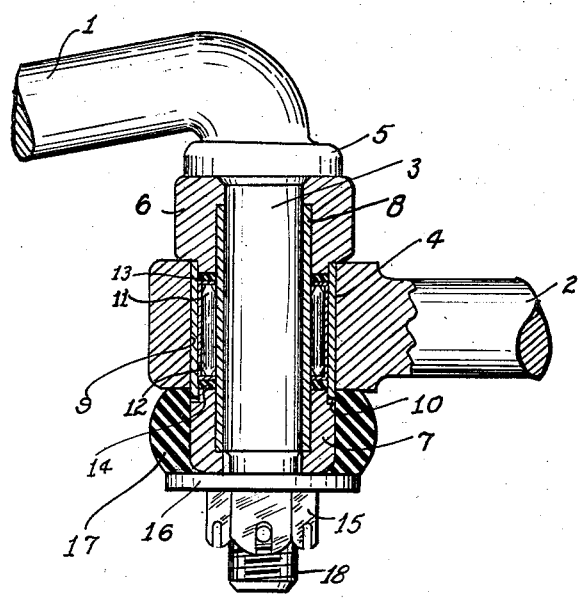

Oct. 22, 1963   M. A. MOSKOVITZ   3,107,949
AXIAL AND RADIAL THRUST ABSORBING CONNECTOR UNIT
Filed July 10, 1961

INVENTOR
MILTON A. MOSKOVITZ
By: Ben V. Zillman
ATTORNEY

United States Patent Office 3,107,949
Patented Oct. 22, 1963

3,107,949
AXIAL AND RADIAL THRUST ABSORBING
CONNECTOR UNIT
Milton A. Moskovitz, 8531 Antler Drive,
Richmond Heights, Mo.
Filed July 10, 1961, Ser. No. 122,719
11 Claims. (Cl. 308—35)

This invention relates to connections between a pair of relatively movable members, and although primarily intended for use in automotive steering mechanisms, the same may be used in interconnecting other pairs of cooperating members of automobiles where the need therefor is indicated.

The principal object of my invention is to so construct a device of this kind, that it may be installed between a pair of relatively oscillatable members to absorb the radial and axial thrust therebetween that is incidental to the normal operation of the vehicle to which the same is applied.

Previously, such connections have been of either the bonded-to-rubber type or of a threaded type. Both such types are open to objection in service. Such connections are intended to rotate freely and absorb exceedingly high torsional loads, yet they must at the same time prevent end play between their parts, or allow angular deflection to such a degree that would manifest itself in the various linkages that are associated with the vehicle wheel.

It is customary with modern steering arrangements, for a center or relay rod to be provided perpendicularly to the longitudinal axis of the vehicle. This rod is connected at one end to the pitman shaft or arm that is associated with the steering column and wheel, while its opposite end is connected to the frame of the vehicle through an idler arm arrangement.

It is to be pointed out that too much looseness in such connections results in erratic steering and car handling, while extreme tightness increases the torque to result in hard steering and impairs the ready returnability of the wheels after they have turned corners. Harsh riding and stiff suspension and other poor riding qualities of the vehicle is the result.

Connectors, or bushings as they are sometimes called, of the aforesaid bonded-to-rubber type have many undesirable features that are in conflict with the attainment of the aforementioned desired requirements. For one, torsional build-up of forces on rotational deflection are soon evident, as well as rapid deterioration and a separation of the rubber from the metal. Such conical deflection is quite prominent in such connectors used for the car suspension.

Where cars employ an anti-brake dive principle, extremely high loads are exerted on the pivot connections, and besides the lack of steering control and stability of suspension encountered with the bonded-to-rubber pivots due to the conical deflection mentioned, there arises a rapid break-down of the connectors. It might be mentioned that undesirable noises build up, and in the adding of oil to quiet the same, said oil acts to deteriorate the natural rubber in the connector quite rapidly. Further, such excess lubrication causes the rubber to separate or break loose from the metal, and this further causes failure through an abrasive action. Such undesirable results occur in the suspension system connectors as well as in those of the steering system.

Connections of the threaded type, due to their necessary manufacturing tolerances, are necessarily loose to begin with, and progress rapidly to a state of failure due to the materials used and the poor bearing qualities necessary to obtain the strength requirements.

The aforementioned defects in both common types of connecting devices are believed to be overcome in the present construction hereinafter described.

Another object of my invention is to so construct a device of the kind described, with a low-friction means incorporated as part thereof, to greatly increase the durability and efficiency of the device.

An added object of the invention is to construct a device aforementioned as a permanently sealed unit, wherein further lubrication during service is not required.

A still further object of my invention is to construct a connector wherein end play of its relatively movable parts is obviated, while permitting the same to have extremely good load-carrying qualities.

Yet another object of the invention is to construct a connector that is economical to make, be simple in construction, neat and compact, exceptionally efficient and satisfactory in performance, and that can be installed while maintained in its pre-assembled state.

Many other objects and advantages of the construction herein shown and described, and the uses obtained, will be obvious to those skilled in the art to which this invention appertains and as will be apparent from the following disclosures.

To this end, my invention consists in the novel form, arrangement, construction and combination of parts herein shown and described, and the uses mentioned, all as will be more clearly pointed out in the claims hereunto appended.

Figure 2:
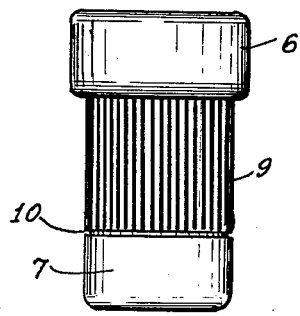

In the drawings, wherein like or corresponding parts are represented by like reference characters thoughout the views, FIGURE 1 is a longitudinal cross-sectional view through the connector, as finally installed in place on the vehicle between a pair of cooperating parts, fragmentary parts of the latter being shown partially in section; and FIGURE 2 is a side view of the connector.

Referring more particularly to the drawings, wherein I have illustrated a preferred embodiment of the invention, there is shown a pair of relatively oscillatable members 1 and 2, respectively, the first one of which has a cylindrical end portion 3 that is provided with a radially enlarged flange 5 adjacent its rearmost end, and the second one of which has an eye 4 extending entirely therethrough and is arranged to be coaxial with and rotatably encircle said cylindrical portion. The member 1 may be any part of the steering mechanism of an automobile, as for instance an idler arm, while the member 2 may be a cooperating part, as for instance a frame bracket.

In the present construction, the connector unit is preferably made as a cartridge in which all of its components are held together already preassembled, and no dis-assembly is required of the same when mounting the device in its intended relationship on the vehicle.

This cartridge unit includes a pair of annular end elements 6 and 7, respectively, one adjacent each end of the cylindrical portion 3 and preferably of a strong material such as of steel. It will be particularly noted that although the forward one of said pair of elements is sufficiently small enough in diameter to pass entirely through the said eye, the other element is preferably made of sufficiently larger diameter to prevent such passage through said eye.

There are a pair of radially spaced-apart sheathes, tubes or sleeves 8 and 9, of a strong, wear-resistant material such as steel, incorporated into said connector, the inner sleeve 8 being interlocked with both of said annular elements 6 and 7, as by a press-fit, to form a rigid interconnection therewith, the bore through said sleeve being substantially the same as that through the elements 6 and 7 to be substantially flush therewith.

The other, or outer sleeve 9, is carried by said elements 6 and 7 of the cartridge unit and preferably similarly press-fitted or otherwise suitably interlocked with the said eye on insertion to be rotatable as a unit therewith. Thus, although the end element 7 may be easily passed through said eye, it requires force to press the outer sleeve into the eye. There may be sufficient side clearance 10 between one end of said outer sleeve and the opposed face of the annular member 7 opposed thereto as to insure that there will be no binding between said sleeve and member after the unit has been mounted into operative position between the members 1 and 2, as might prevent ease of oscillatable movement between said members.

Interposed in the space between the inner and outer sleeves there is a low-friction means to absorb the axial and radial thrust between the members 1 and 2. This low-friction means may include a roller or needle bearing 11, the outer circumferential cage 12 of which is preferably press-fitted into the outer sleeve 9 to rotate with the latter, said rollers operably engaging the inner sleeve 8.

Now, as one of the pair of interconnected members, as for example the member 2, oscillates relatively of said cylindrical portion 3, the anti-friction rollers will rotate on the inner sleeve and at the same time the radial thrust will be absorbed thereby.

In addition to said needle bearing, further low-friction means may be interposed between the outer ends of said bearing and the adjacent ends of the annular members 6 and 7, as for example the rings 13 and 14 of a suitable plastic such as nylon, Delrin, etc., said rings being preferably press-fitted into place to substantially fill the space between the annular end members and said needle bearing. Initially said rings may be sufficiently small enough to easily fit into the radial space between said sleeves, so that when the needle bearing is longitudinally actuated through any cause, when taking side load, the plastic ring that is in the path of said axial shift is pressed toward the opposed annular end element and is slightly yieldably radially enlarged or deformed to thereby absorb such longitudinal thrust. Of course, said plastic rings will absorb radial thrust as well. In addition, said rings have the additional purpose to act as seals to keep objectional matter from entering into the working parts of the connector and to retain lubricant in the same.

The annular end elements may be reduced sufficiently in diameter at their mutually opposed ends to enter or nest into the bore of said outer sleeve. However, it is important that the relative diameters at these nesting portions is not sufficient to cause any binding thereat, and not interfere with the free rotary movement of the outer sleeve relative to said annular end elements.

When mounting said pre-assembled cartridge in place, the same may first be forcibly inserted from one of its ends through said eye, so that the outer sleeve interlocks with the latter, and then the cylindrical portion of the member 1 may be passed through the bore of the cartridge so that a threaded terminal end 18 of said portion 3 extends axially past the forward end of the element 7 to receive a nut or other fastener 15 thereon. Adjustment of this nut will provide the desired turning torque between the member 2 and the cartridge.

A washer 16 may be interposed between said nut and the forward end annular element, said washer being of sufficiently greater diameter to project radially beyond the latter. In this manner, it is impossible for the cylindrical portion and the connector to accidentally pull apart axially.

A yieldably resilient seal 17, in the form of an annular gasket or ring, may be interposed between said washer and the adjacent side wall of the member 2 to prevent the passage of foreign matter, such as dirt, moisture or the like, into the working parts of the device, and this element also serves to adjust the degree of turning torque between the relatively oscillatable members.

However, the clearance 10 will insure that the member 2 may always be free to oscillate relatively of the cartridge, because it is apparent that, no matter how much the annular end members 6 and 7 are forced together, the inner sleeve will limit the amount of such movement.

A connecting unit of the type hereinbefore described has excellent slipstick characteristics, and an extremely low turning torque, both statically and dynamically.

I claim:

1. A pre-assembleable radial and end-thrust unit comprising a pair of axially spaced-apart annular end elements, radially spaced-apart tubular inner and outer sleeves extending between said end elements, low-friction bearing means engageably interposed between said sleeves and axially held in place between said elements and firmly fixedly anchored to only one of said sleeves to move only together with said latter sleeve to prevent relative rotation therebetween, the second of said sleeves being in engagement with both of said end elements to maintain the latter in pre-determined spaced-apart relation, and said bearing means rotatably engaging said second one of said sleeves, whereby the latter sleeve and the end elements may rotate together relative to said first sleeve and said bearing means.

2. A unit as set forth in claim 1, wherein said bearing means includes an elongated needle-bearing mounted for rotation in the annular space between said sleeves.

3. A unit as set forth in claim 1, further characterized in that said inner sleeve and end elements have bored portions of substantially the same diameter.

4. A unit as set forth in claim 1, wherein an axial clearance is provided between said outer sleeve and at least one of said spaced apart end elements.

5. A unit as set forth in claim 1, further characterized in that the outer peripheral surface of said outer sleeve is sufficiently larger in diameter than that of at least one of said end elements to provide a press-fit engagement surface on said outer sleeve for mounting said unit in a supporting member while said unit remains assembled.

6. A unit as set forth in claim 1, further characterized in that the peripheral outer surface of the outer sleeve is formed for a drive-fit rigid interlock with a supporting member while said end elements and inner sleeve are rotatable.

7. A pre-assembleable radial and end-thrust unit comprising a pair of axially spaced-apart annular end elements, radially spaced-apart tubular inner and outer sleeves extending between said elements, needle-bearing means mounted for rotation in the annular space between said end elements, yieldingly deformable bearing-ring means positioned between said sleeves and constantly in operative pressure-engagement with at least one end of said bearing means, said inner sleeve being in engagement with both of said end elements to maintain the latter spaced apart, and said end elements including portions retaining said outer sleeve in place between said end elements for rotatable movement of said bearing means relative to said inner sleeve and end elements.

8. A pre-assembled cartridge adapted to be mounted as a unit without dis-assembling said cartridge, said cartridge comprising a pair of axially spaced-apart annular end elements having sufficiently different outside diametral portions so that only the end element with the smaller diametral portion may be adapted to be passed through an eye, radially spaced-apart inner and outer tubular sleeves extending between said end elements, said inner sleeve having opposing end portions in press-fit engagement with both of said end elements, said outer sleeve being retained in said spaced relation to said inner sleeve by portions of said end elements fitting between said sleeves, and low-friction bearing means rotatably interposed between said sleeves.

9. A cartridge as set forth in claim 8, further characterized in that the outer sleeve is just enough larger than the smaller end element to rigidly interlock with an eye member on mounting of said cartridge after said smaller-diameter end element has passed through said eye.

10. A cartridge as set forth in claim 8, wherein said bearing means has at least one end spaced from one of said end elements, and a yieldable thrust member positioned between said sleeves in the space between at least one element and the adjacent end of said bearing means.

11. A cartridge as set forth in claim 8, wherein said bearing means comprises an elongated needle-bearing mounted for rotation in the annular space between said sleeves, said needle-bearing having opposing ends spaced from both of said end elements, and a pair of yieldingly deformable members positioned between said sleeves in the spaces between said end elements and said needle-bearing ends respectively.

References Cited in the file of this patent

UNITED STATES PATENTS

| | | |
|---|---|---|
| 2,259,324 | Robinson | Oct. 14, 1941 |
| 2,374,720 | Ashton | May 1, 1945 |
| 2,385,170 | Tedd | Sept. 18, 1945 |
| 2,757,015 | Latzen | July 31, 1956 |
| 3,004,808 | Powers | Oct. 17, 1961 |
| 3,006,703 | Bensch | Oct. 31, 1961 |